United States Patent [19]

Thomas

[11] Patent Number: 5,327,894
[45] Date of Patent: Jul. 12, 1994

[54] WALL FILTER USING CIRCULAR CONVOLUTION FOR A COLOR FLOW IMAGING SYSTEM

[75] Inventor: Lewis J. Thomas, Schenectady, N.Y.

[73] Assignee: General Electric Company, Schenectady, N.Y.

[21] Appl. No.: 24,009

[22] Filed: Mar. 1, 1993

[51] Int. Cl.$^5$ ............................................. A61B 8/06
[52] U.S. Cl. ......................... 128/661.08; 128/661.09; 73/861.25; 348/163; 348/607
[58] Field of Search .................. 128/661.08, 661.01, 128/661.09, 661.10; 73/625, 626, 861.25; 358/82, 112, 167

[56] References Cited

U.S. PATENT DOCUMENTS

| | | | |
|---|---|---|---|
| 4,839,652 | 6/1989 | O'Donnell et al. | 341/122 |
| 4,926,872 | 5/1990 | Brock-Fisher et al. | 128/661.01 |
| 4,983,970 | 1/1991 | O'Donnell et al. | 341/122 |
| 5,058,593 | 10/1991 | Forestieri et al. | 128/661.09 |
| 5,123,417 | 6/1992 | Walker et al. | 128/661.09 |
| 5,228,009 | 7/1993 | Forestieri et al. | 128/661.09 |

OTHER PUBLICATIONS

S. Leavitt et al., "A Scan Conversion Algorithm for Displaying Ultrasound Images", Hewlett-Packard Journal, Oct. 1983, pp. 30-34.
C. Kasai et al., "Real-Time Two-Dimensional Blood Flow Imaging Using an Autocorrelation Technique", IEEE Transactions on Sonics and Ultrasonics, vol. SU-32, No. 3, May 1985, pp. 458-463.

Primary Examiner—William E. Kamm
Assistant Examiner—George Manuel
Attorney, Agent, or Firm—Marvin Snyder

[57] ABSTRACT

An ultrasonic imaging system includes a receiver which demodulates the echo signals received by a transducer array and dynamically focuses the baseband echo signals, and a color flow processor which includes an adaptive wall filter in the form of a circular convolution filter that enables a narrow band of wall signals to be removed without loss of data samples. The mean frequency of the resulting filtered baseband echo signals is used to indicate the velocity of flowing reflectors and to control color of the displayed image.

20 Claims, 9 Drawing Sheets

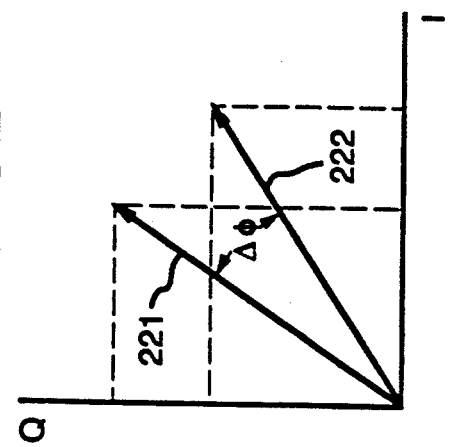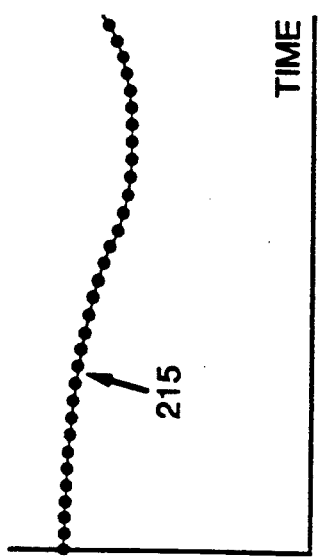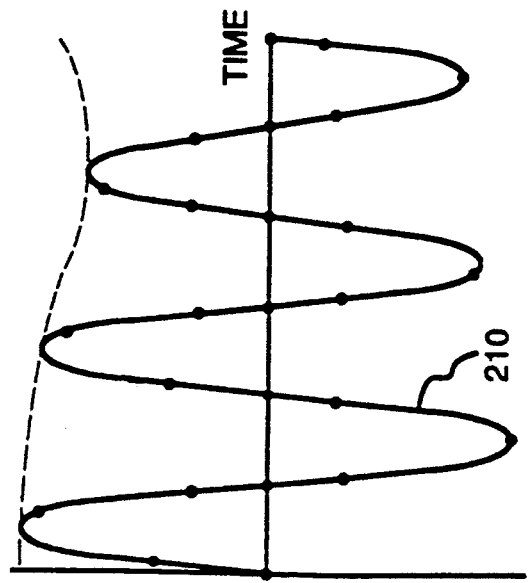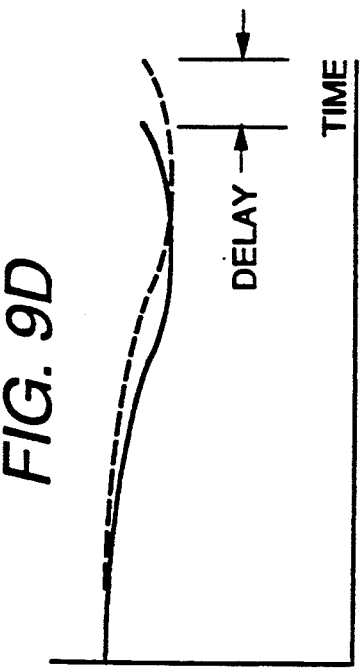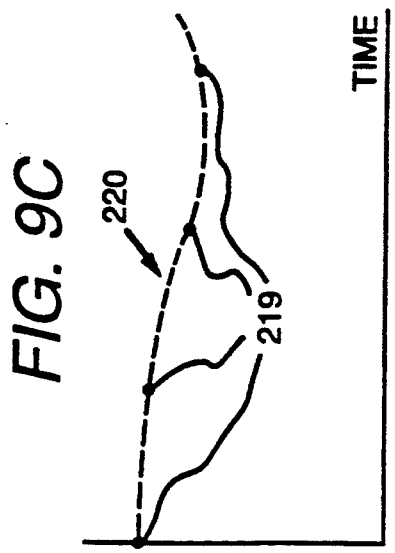

WALL FILTER USING CIRCULAR CONVOLUTION FOR A COLOR FLOW IMAGING SYSTEM

BACKGROUND OF THE INVENTION

This invention relates imaging by use or vibratory energy such as acoustical energy and, in particular, to production of color flow images based on the Doppler shift of ultrasonic signals.

There are a number of modes in which vibratory energy, such as ultrasound can be used to produce images of objects. The ultrasound transmitter may be placed on one side of the object and the sound transmitted through the object to the ultrasound receiver placed on the other side ("transmission mode"). With transmission mode methods, an image may be produced in which the brightness of each pixel is a function of amplitude of the ultrasound that reaches the receiver ("attenuation" mode), or the brightness of each pixel is a function of the time required for the sound to reach the receiver ("time-of-flight" or "speed of sound" mode). In the alternative, the receiver may be positioned on the same side of the object as the transmitter and an image may be produced in which brightness of each pixel is a function of amplitude of the ultrasound reflected from the object back to the receiver ("reflection" "backscatter" or "echo" mode). The present invention relates to a backscatter method for producing ultrasound images.

There are a number of well known backscatter methods for acquiring ultrasound data. In the so-called "A-scan" method, an ultrasound pulse is directed into the object by the transducer and the amplitude of the reflected sound is recorded over a period of time. The echo signal amplitude is proportional to the scattering strength of the reflectors in the object and the time delay is proportional to the range of the reflectors from the transducer. In the so-called "B-scan" method, the transducer transmits a series of ultrasonic pulses as it is scanned across the object along a single axis of motion. The resulting echo signals are recorded as with the A-scan method and their amplitude is used to modulate the brightness of pixels on a display at the time delay. With the B-scan method, enough data are acquired from which an image of the reflectors can be reconstructed.

In the so-called C-scan method, the transducer is scanned across a plane above the object and only the echoes reflecting from the focal depth of the transducer are recorded. The sweep of the electron beam of a CRT display is synchronized to the scanning of the transducer so that the x and y coordinates of the transducer correspond to the x and y coordinates of the image.

Ultrasonic transducers for medical applications are constructed from one or more piezoelectric elements sandwiched between a pair of electrodes. Such piezoelectric elements are typically constructed of lead zirconate titanate (PZT), polyvinylidene difluoride (PVDF), or PZT ceramic/polymer composite. The electrodes are connected to a voltage source, and when a voltage waveform is applied, the piezoelectric elements change in size at a frequency corresponding to that of the applied voltage. When a voltage waveform is applied, the piezoelectric element emits an ultrasonic wave into the media to which it is coupled. Conversely, when an ultrasonic wave strikes the piezoelectric element, the element produces a corresponding voltage across its electrodes. Typically, the front of the element is covered with an acoustic matching layer that improves the coupling with the media in which the ultrasonic waves propagate. In addition, a backing material is coupled to the rear of the piezoelectric element to absorb ultrasonic waves that emerge from the back side of the element so that they do not interfere. A number of such ultrasonic transducer constructions are disclosed in U.S. Pat. Nos. 4,217,684; 4,425,525; 4,441,503; 4,470,305 and 4,569,231, all of which are assigned to the instant assignee.

When used for ultrasound imaging, the transducer typically has a number of piezoelectric elements arranged in an array and driven with separate voltages (apodizing). By controlling the time delay (or phase) and amplitude of the applied voltages, the ultrasonic waves produced by the piezoelectric elements combine to produce a net ultrasonic wave that travels along a preferred beam direction and is focused at a selected point along the beam. By controlling the time delay and amplitude of the applied voltages, the beam with its focal point can be moved in a plane to scan the subject.

The same principles apply when the transducer is employed to receive the reflected sound (receiver mode). That is, the voltages produced at the transducer elements in the array are summed together such that the net signal is indicative of the sound reflected from a single focal point in the subject. As with the transmission mode, this focused reception of the ultrasonic energy is achieved by imparting separate time delay (and/or phase shifts) and gains to the signal from each transducer array element.

This form of ultrasonic imaging is referred to as "phased array sector scanning", or "PASS". Such a scan is comprised of a series of measurements in which the steered ultrasonic wave is transmitted, the system switches to receive mode after a short time interval, and the reflected ultrasonic wave is received and stored. Typically, the transmission and reception are steered in the same direction ($\theta$) during each measurement to acquire data from a series of points along an acoustic beam or scan line. The receiver is dynamically focused at a succession of ranges (R) along the scan line as the reflected ultrasonic waves are received. The time required to conduct the entire scan is a function of the time required to take each measurement and the number of measurements required to cover the entire region of interest at the desired resolution and signal-to-noise ratio. For example, a total of 128 scan lines may be acquired over a 90 degree sector, with each scan line being steered in increments of 0.70°. A number of such ultrasonic imaging systems are disclosed in U.S. Pat. Nos. 4,155,258; 4,155,260; 4,154,113; 4,155,259; 4,180,790; 4,470,303; 4,662,223; 4,669,314 and 4,809,184, all of which are assigned to the instant assignee.

Techniques for measuring blood flow in the heart and vessels using the Doppler effect are well known. Whereas the amplitude of the reflected waves is employed to produce black and white anatomical images of the tissues, the frequency shift of the reflected waves may be used to measure the velocity of reflecting scatterers from tissue or blood. Color flow images are produced by superimposing a color image of the velocity of moving material, such as blood, onto the black and white anatomical image. The measured velocity of flow at each pixel determines its color.

A major difficulty in obtaining Doppler effect measurements of reflected ultrasonic waves from blood is that the received echo signal typically contains a large component produced by stationary or slowly moving tissues, whereas blood reflects ultrasound very weakly. The stationary tissues do not produce any frequency shift in the reflected waves and these components can be easily filtered out without affecting the flow measurement. However, the reflections produced by the moving tissue due to cardiac or respiratory motion are frequency shifted and may completely overwhelm signals from slowly flowing blood. Prior systems provide a "wall filter" which is manually adjusted by the operator to filter out a narrow band of frequencies in the echo signal centered on the carrier frequency where static signals lie.

If low velocity flow is to be detected, a very narrow wall filter must be used so as not to eliminate the blood flow signal. In general, a narrow filter implemented digitally requires more filter coefficients than a broad filter, and since the number of echo signal samples available at the output of the filter is the number of input samples minus the number of filter coefficients, plus 1, this means that when narrow wall filters are employed fewer echo signal samples are available to calculate flow. For example, if a signal with 16 digital samples is filtered using an 8-coefficient FIR filter, only nine samples are available at the filter output from which the flow may be estimated. This is undesirable because error in the flow estimate due to noise is reduced as the number of data samples increases. Thus, as the wall filter is narrowed to increase the signal from low velocity flow, measurement accuracy is reduced.

SUMMARY OF THE INVENTION

The present invention relates to a color flow processor for an ultrasonic imaging system employing an adaptive wall filter which may be very narrow, but which does not reduce the number of data samples available to calculate flow velocity. The color flow processor includes a mixer which receives the demodulated baseband echo signal as a set of samples and produces a set of modified echo signal samples which are shifted in frequency by an amount necessary to place the wall signal at or near D.C. (i.e. zero frequency); a circular convolution filter which receives the set of modified echo signal samples and produces a corresponding set of filtered echo signal samples by performing a circular convolution of the set of modified echo signal samples with a wall filter kernel; an autocorrelation estimator which produces an output signal indicative of the mean frequency of the set of filtered echo signal samples; and means responsive to the autocorrelation estimator for producing a color signal indicative of velocity.

A general object of the invention is to improve the accuracy and sensitivity of ultrasonic color flow measurements. By performing a circular convolution on the echo signal, no samples are lost in the wall filtering process and a better flow estimate can be calculated even though a very narrow filter kernel with many coefficients is employed.

Another object of the invention is to provide a very narrow wall filter which is easy to implement and does not reduce the number of echo signal samples available for flow calculation. In a special case of the circular convolution filter, the average value of all the samples in the set of modified echo signal samples is calculated and subtracted from each sample. This effectively removes the D.C. component from the modified echo signal, which is the wall signal component if the mixer produces the optimal frequency shift in the echo signal samples. This D.C. removal is sufficient to suppress wall signals and requires much less computation than a standard circular convolution or a conventional FIR filter.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIGS. 2A and 2B are graphical illustrations of the signal in any of the channels of transmitter 50 of FIG. 2;

FIGS. 9A–9E are graphical illustrations of the signal at various points in the receiver channel of FIG. 5.

DESCRIPTION OF THE PREFERRED EMBODIMENT

Figure 1:
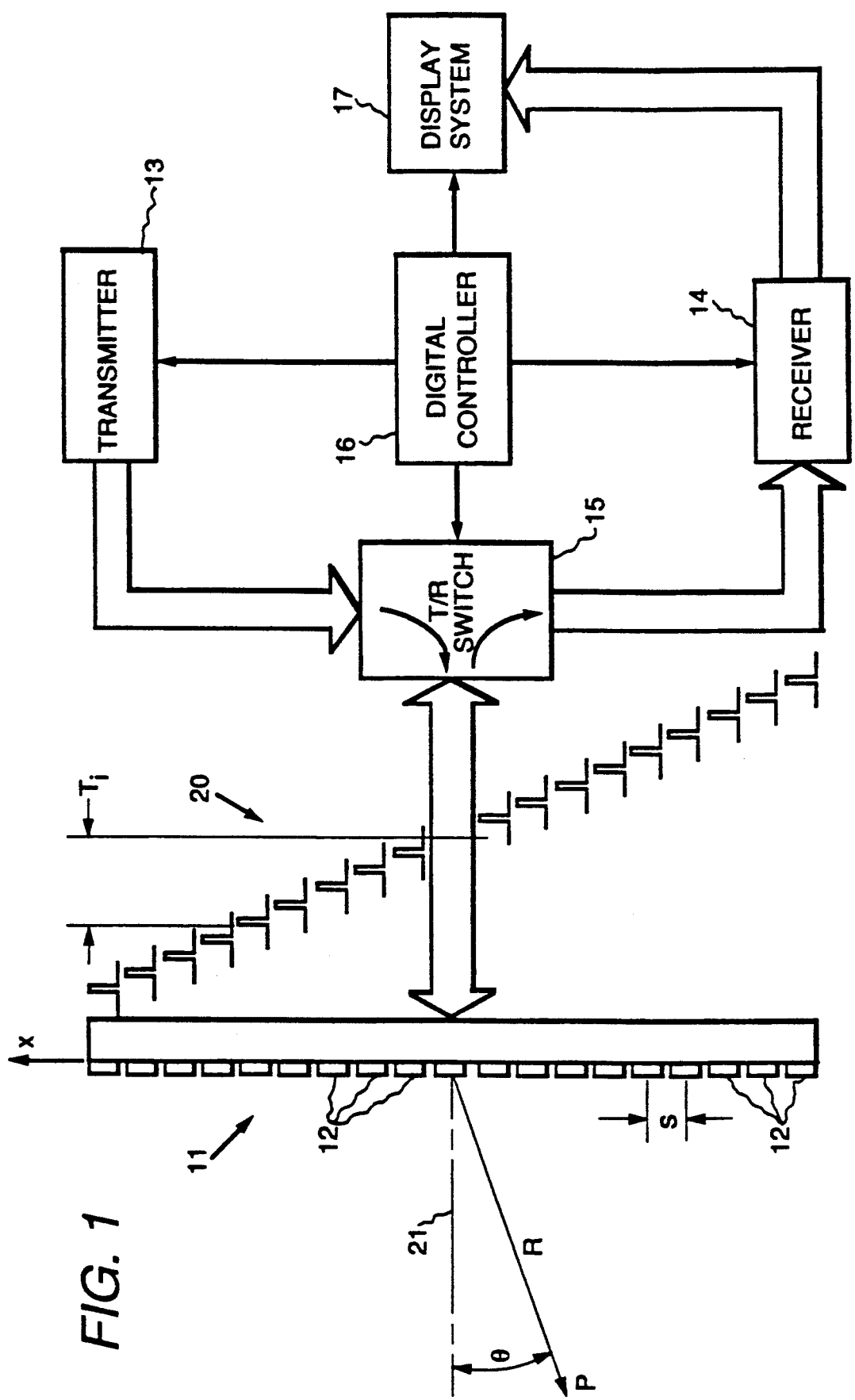
FIG. 1 is a block diagram of a vibratory energy imaging system which employs the present invention.

Referring particularly to FIG. 1, a vibratory energy imaging system includes a transducer array 11 comprised of a plurality of separately driven elements 12 which each produce a burst of vibratory energy, such as ultrasonic energy, when energized by a pulsed waveform produced by a transmitter 13. The vibratory energy reflected back to transducer array 11 from the subject under study is converted to an electrical signal by each transducer element 12 and applied separately to a receiver 14 through a set of transmit/receive (T/R) switches 15. Transmitter 13, receiver 14 and switches 15 are operated under control of a digital controller 16 responsive to commands by a human operator. A complete scan is performed by acquiring a series of echoes in which switches 15 are set to their transmit position, transmitter 13 is gated on momentarily to energize each transducer element 12, switches 15 are then set to their receive position, and the subsequent echo signals produced by each transducer element 12 are applied to receiver 14. The separate echo signals from each transducer element 12 are combined in receiver 14 to produce a single echo signal which is employed to produce a line in an image on a display system 17.

Transmitter 13 drives transducer array 11 such that the vibratory energy produced, e.g., ultrasonic energy, is directed, or steered, in a beam. A B-scan can therefore be performed by moving this beam through a set of angles from point-to-point rather than physically moving transducer array 11. To accomplish this, transmitter 13 imparts a time delay ($T_i$) to the respective pulsed waveforms 20 that are applied to successive transducer elements 12. If the time delay is zero ($T_i=0$), all the transducer elements 12 are energized simultaneously and the resulting ultrasonic beam is directed along an axis 21 normal to the transducer face and originating from the center of transducer array 11. As the time delay ($T_i$) is increased, as illustrated in FIG. 1, the ultrasonic beam is directed downward from central axis 21 by an angle $\theta$. The relationship between the time delay increment $T_i$ added successively to each $i^{th}$ signal from one end of the transducer array (i=1) to the other end (i=n) is given by the following relationship:

$$T_i = R_T/c - \sqrt{(R_T/c)^2 + (x/c)^2 - 2xR_T\sin\theta/c^2} \quad (1)$$

where:
- x=distance of center of element i from center of transducer array,
- $\theta$=transmit beam angle,
- c=velocity of sound in the object under study, and
- $R_T$=range at which transmit beam is focused.

The time delays $T_i$ in equation (1) have the effect of steering the beam in the desired angle $\theta$, and causing it to be focused at a fixed range $R_T$. A sector scan is performed by progressively changing the time delays $T_i$ in successive excitations. The angle $\theta$ is thus changed in increments to steer the transmitted beam in a succession of directions. When the direction of the beam is above central axis 21, the timing of pulses 20 is reversed, but the formula of equation (1) still applies.

Referring still to FIG. 1, the echo signals produced by each burst of ultrasonic energy emanate from reflecting objects located at successive positions along the ultrasonic beam. These are sensed separately by each segment 12 of transducer array 11 and a sample of the magnitude of the echo signal at a particular point in time represents the amount of reflection occurring at a specific range (R). Due to differences in the propagation paths between a reflecting point P and each transducer element 12, however, these echo signals will not occur simultaneously and their amplitudes will not be equal. The function of receiver 14 is to amplify and demodulate these separate echo signals, impart the proper time delay and phase shift to each, and sum them together to provide a single echo signal which accurately indicates the total ultrasonic energy reflected from point P located at range R along the ultrasonic beam oriented at angle $\theta$.

To simultaneously sum the electrical signals produced by the echoes from each transducer element 12, time delays and phase shifts are introduced into each separate transducer element channel of receiver 14. The beam time delays for reception are the same delays ($T_i$) as the transmission delays described above; however, in order to dynamically focus, the time delay and phase shift of each receiver channel is continuously changed during reception of the echo to provide dynamic focusing of the received beam at the range R from which the echo signal emanates. The equation for the time delay imposed on the signal received by each transducer element is:

$$T_d = t/2 - \sqrt{(t/2)^2 + (x/c)^2 - (xt/c)\sin(\theta)} \quad (2)$$

where:
- t=elapsed time after sound transmission from center of transducer array (i.e. START),
- c=velocity of sound in the object under study,
- $\theta$=beam angle, and
- x=distance between center of the receiving element and center of transducer array.

The same calculation, suitably scaled, also provides the correct phase shift.

Under direction of digital controller 16, receiver 14 provides delays during the scan such that steering of receiver 14 tracks with the direction of the beam steered by transmitter 13 and it samples the echo signals at a succession of ranges (R) and provides the proper delays and phase shifts to dynamically focus at points P along the beam. Thus each emission of an ultrasonic pulse waveform results in acquisition of a series of data points which represent the amount of reflected sound from a corresponding series of points P located along the ultrasonic beam.

Display system 17 receives the series of data points produced by receiver 14 and converts the data to a form producing the desired image. For example, if an A-scan is desired, the magnitude of the series of data points is merely graphed as a function of time. If a B-scan is desired, each data point in the series is used to control brightness of a pixel in the image, and a scan comprised of a series of measurements at successive steering angles ($\theta$) is performed to provide the data necessary for an anatomical display.

Figure 2:
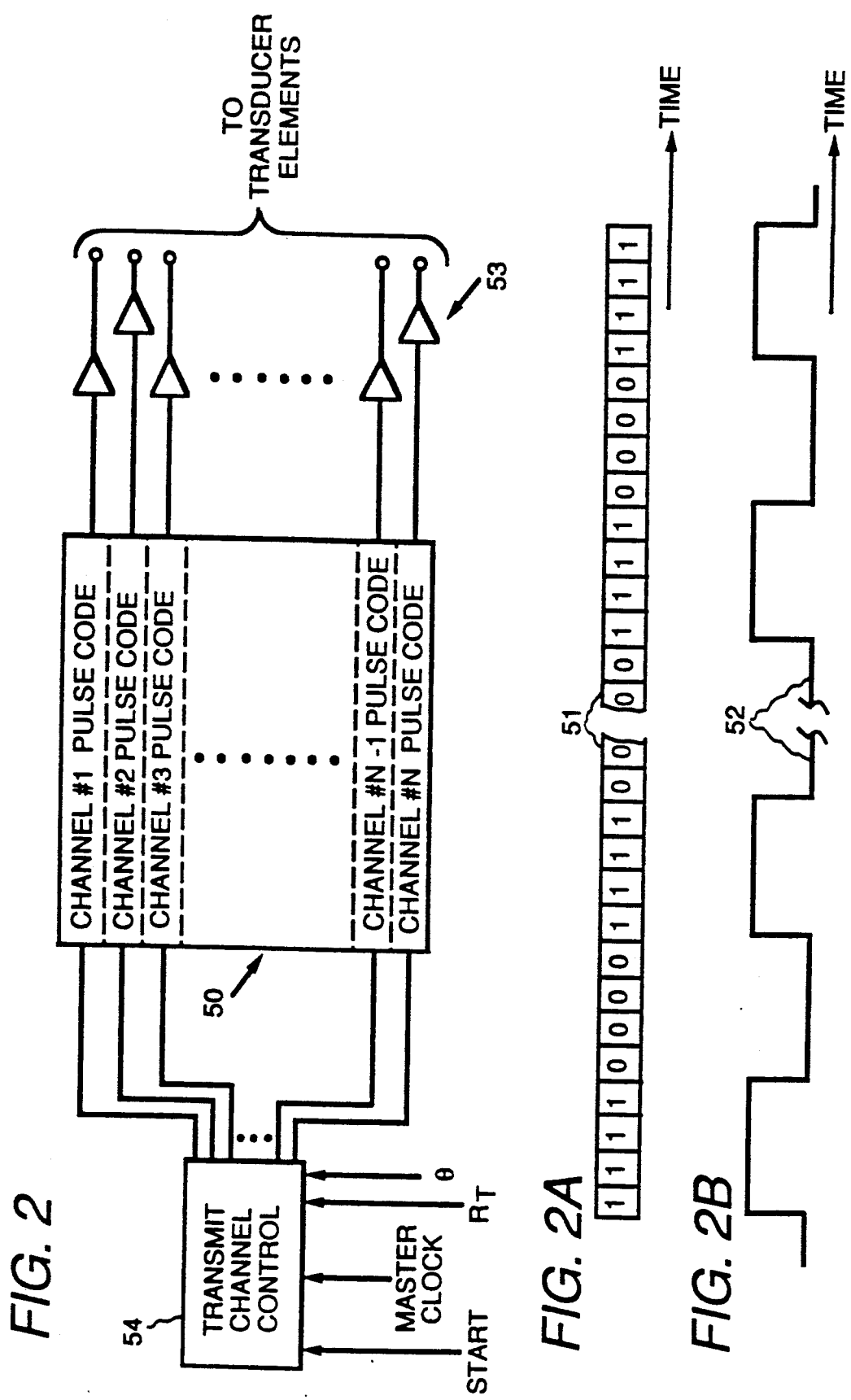
FIG. 2 is a block diagram of a transmitter which forms part of the system of FIG. 1.

Referring particularly to FIG. 2 in conjunction with FIGS. 1, 2A and 2B, transmitter 13 includes a set of channel pulse code memories which are indicated collectively as memories 50. In the preferred embodiment there are 128 separate transducer elements 12, and therefore there are 128 separate channel pulse code memories 50. Each pulse code memory 50 is typically a 1-bit by 512-bit memory which stores a bit pattern 51, shown in FIG. 2A, that determines the frequency of ultrasonic pulse 52, shown in FIG. 2B, that is to be produced. In the preferred embodiment, the bit pattern is read out of each pulse code memory 50 by a 40 MHz master clock and applied to a driver 53 which amplifies the signal to a power level suitable for driving transducer 11. In the example shown in FIG. 2A, the bit pattern is a sequence of four "1" bits alternated with four "0" bits to produce a 5 MHz ultrasonic pulse 52; however, other carrier frequencies ($F_0$) are employed in the preferred embodiment, such as 2.5, 3.75, 6.25, 7.5, 8.75 and 10 MHz. The transducer elements 11 (FIG. 1) to which these ultrasonic pulses 52 are applied respond by producing ultrasonic energy. If all 512 bits are used, a pulse of bandwidth as narrow as 40 kHz centered on the carrier frequency (i.e. 5 MHz in the example) will be emitted.

As indicated above, to steer the transmitted beam of ultrasonic energy in the desired direction ($\theta$), pulses 52 for each of the N channels, such as shown in FIG. 2B, must be delayed by the proper amount. These delays are provided by a transmit control 54 which receives four control signals (START, MASTER CLOCK, $R_T$ and $\theta$) from digital controller 16 (FIG. 1). Using the input control signal $\theta$, the fixed transmit focus $R_T$, and the above equation (1), transmit control 54 calculates the delay increment $T_i$ required between successive transmit channels. When the START control signal is received, transmit control 54 gates one of four possible phases of the 40 MHz MASTER CLOCK signal through to the first transmit channel 50. At each successive delay time interval ($T_i$) thereafter, one of the phases of the 40 MHz MASTER CLOCK signal is gated through to the next channel pulse code memory 50 until all N=128 channels are producing their ultrasonic pulses 52 (FIG. 2B). Each transmit channel 50 is reset after its entire bit pattern 51, such as shown in FIG. 2A, has been transmitted and transmitter 13 then waits for the next $\theta$ and next START control signals from digital controller 16. As indicated above, in the preferred embodiment of the invention a complete B-scan is comprised of 128 ultrasonic pulses steered in $\Delta\theta$ increments of 0.70° through a 90° sector centered about central axis 21 (FIG. 1) of transducer 11. For color flow imaging, from four to sixteen firings of transmitter 13 is typically performed at each beam angle $\theta$ to acquire sufficient echo data from which flow can be calculated.

For a detailed description of transmitter 13, reference is made to U.S. Pat. No. 5,014,712 issued on May 14, 1991 and entitled "Coded Excitation For Transmission Dynamic Focusing of Vibratory Energy Beam" incorporated herein by reference Referring particularly to FIG. 3 in conjunction with FIG. 1, receiver 14 is comprised of three sections: a time-gain control section 100, a receive beam forming section 101, and a mid processor 102. Time-gain control section 100 includes an amplifier 105 for each of the N=128 receiver channels and a time-gain control circuit 106. The input of each amplifier 105 is connected to a respective one of transducer elements 12 to receive and amplify the echo signal which it receives. The amount of amplification provided by amplifiers 105 is controlled through a control line 107 that is driven by time-gain control circuit 106. As is well known in the art, as the range of the echo signal increases, its amplitude is diminished. As a result, unless the echo signal emanating from more distant reflectors is amplified more than the echo signal from nearby reflectors, the brightness of the image diminishes rapidly as a function of range (R). This amplification is controlled by the operator who manually sets eight (typically) TGC linear potentiometers 108 to values which provide a relatively uniform brightness over the entire range of the sector scan. The time interval over which the echo signal is acquired determines the range from which it emanates, and this time interval is divided into eight segments by TGC control circuit 106. The settings of the eight potentiometers are employed to set the gain of amplifiers 105 during each of the eight respective time intervals so that the echo signal is amplified in ever increasing amounts over the acquisition time interval.

The receive beam forming section 101 of receiver 14 includes N=128 separate receiver channels 110. As will be explained in more detail below, each receiver channel 110 receives the analog echo signal from one of TGC amplifiers 105 at an input 111 and produces a stream of digitized output values on an I bus 112 and a Q bus 113. Each of these I and Q values represents a demodulated sample of the echo signal envelope at a specific range (R). These samples have been delayed and phase shifted such that when they are summed at summing points 114 and 115 with the I and Q samples from each of the other receiver channels 110, they indicate the magnitude and phase of the echo signal reflected from a point P located at range R on the steered beam ($\theta$). In the preferred embodiment, each echo signal is sampled at 150 micrometer increments over the entire range of the scan line (typically 40 to 200 millimeters).

For a more detailed description of receiver 14, reference is made to U.S. Pat. No. 4,983,970 which issued on Jan. 8, 1991 and is entitled "Method And Apparatus for Digital Phase Array Imaging", and which is incorporated herein by reference.

Figure 3:
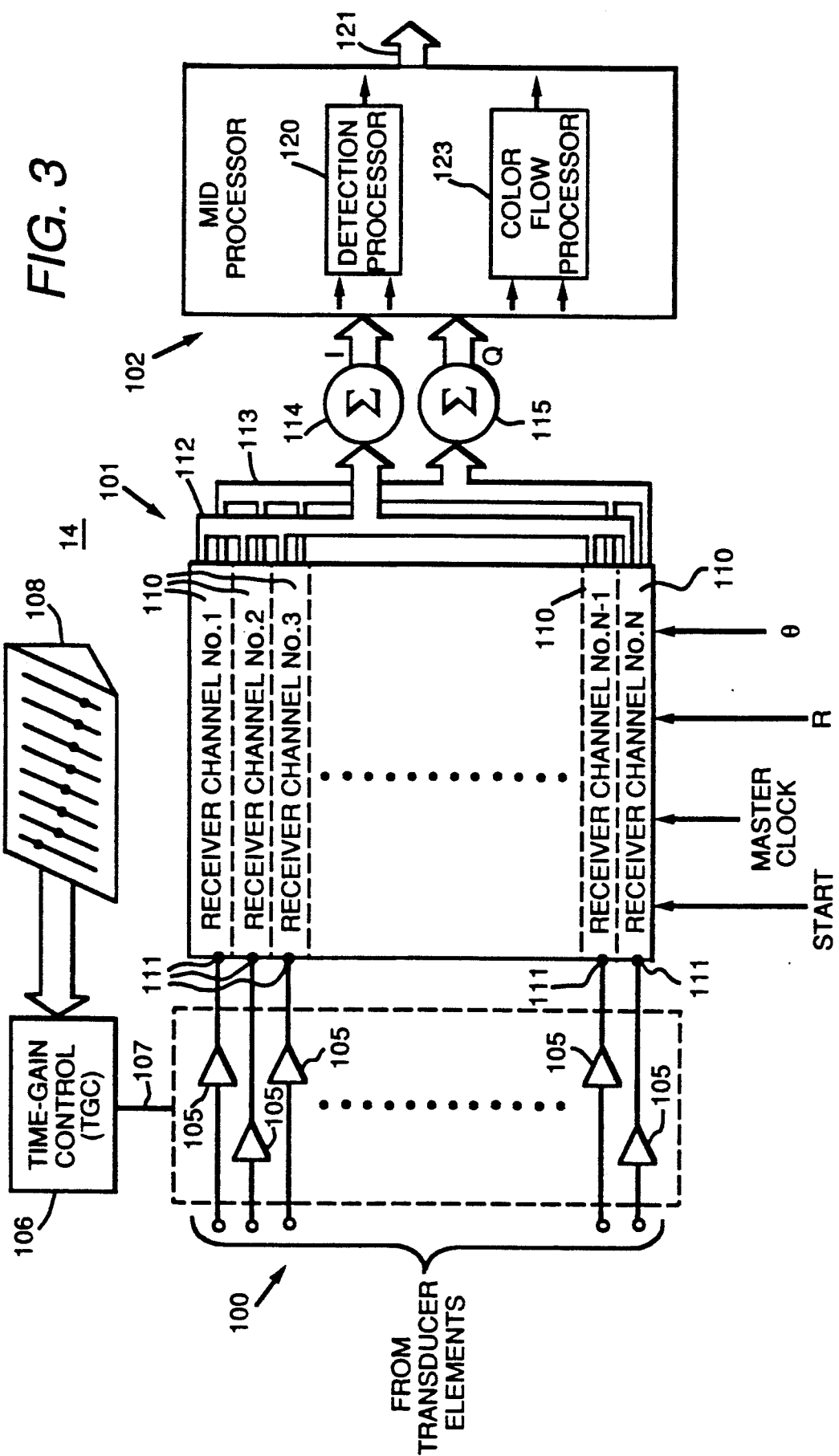
FIG. 3 is a block diagram of a receiver which forms part of the system of FIG. 1.

Referring still to FIG. 3, mid processor section 102 receives the beam samples from summing points 114 and 115. The I and Q values of each beam sample are 20-bit digital numbers representing the in-phase and quadrature components of the magnitude of reflected sound from a point (R,$\theta$). Mid processor 102 can perform a variety of calculations on these beam samples, where choice is determined by the type of image to be reconstructed. For example, if a conventional magnitude anatomical image is to be produced, a detection processor 120 is implemented in which a digital magnitude M is calculated from each beam sample and produced at output 121 along with the R,$\theta$ coordinates of the reflection point, according to $$M = \sqrt{I^2 + Q^2}.$$

Detection processor 120 may also implement correction methods such as disclosed in commonly assigned U.S. Pat. No. 4,835,689, issued May 30, 1989 and entitled "Adaptive Coherent Energy Beam Formation Using Phase Conjugation." Such correction methods examine the received beam samples and calculate corrective values that can be used in subsequent measurements by transmitter 13 and receiver 14 to improve beam focusing and steering. Such corrections are necessary, for example, to account for the non-homogeneity of the media through which the sound from each transducer element travels during a scan.

The present invention includes a color flow processor 123 which is also located in mid processor 102. Color flow processor 123, which is described in more detail below with respect to FIG. 6, receives the I and Q values of each demodulated and focused echo signal sample from summing points 114 and 115, and produces a 12-bit flow value at mid processor output 121. This flow signal determines the display of red, green and blue colors, and is applied to display system 17 (FIG. 1) along with the magnitude M for the same point. As is explained in more detail below, the color indicated by this flow value is a function of the velocity and direction of flow as measured by color flow processor 123.

Figure 4:
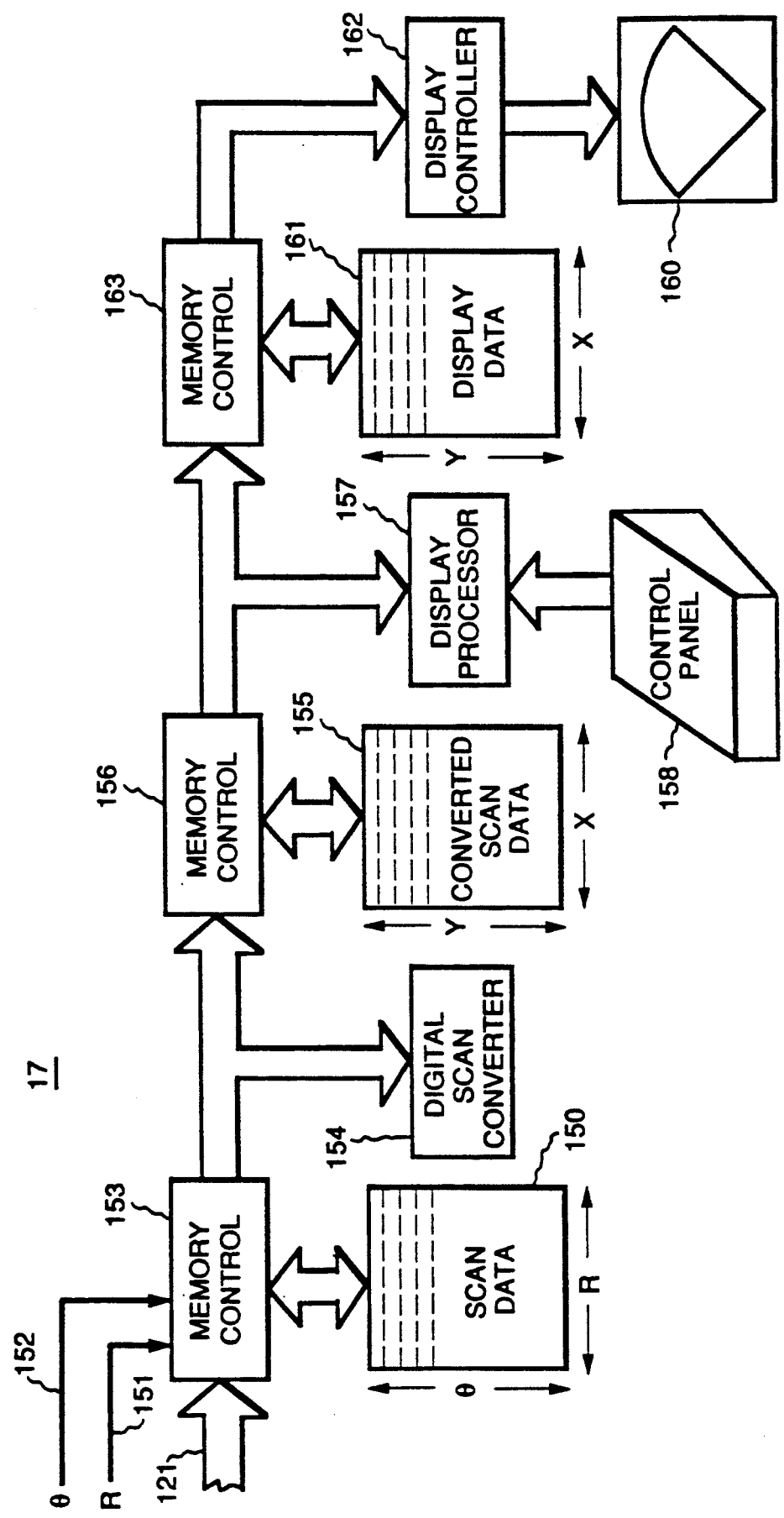
FIG. 4 is a block diagram of a display system which forms part of the system of FIG. 1.

Referring particularly to FIGS. 1 and 4, receiver 14 generates a stream of digital numbers at its output 121, which is applied to the input of the display system 17. The signal at output 121 includes an 8-bit tissue magnitude and a 12-bit flow value. This "scan data" is stored in separate memories 150 as an array, with the rows of scan data array 150 corresponding with the respective beam angles ($\theta$) that are acquired, and the columns of scan data array 150 corresponding with the respective ranges (R) at which samples are acquired along each beam. The R and $\theta$ control signals 151 and 152 from receiver 14 indicate where each input value is to be stored in array 150, and a memory control circuit 153 writes that value to the proper memory location in array 150. The scan can be continuously repeated and the flow of values from receiver 14 will continuously update scan data array 150.

Referring still to FIG. 4, the scan data in each array 150 is read by a digital scan converter 154 and converted to a form producing the desired image. If a conventional B-scan image is being produced, for example, the tissue magnitude and flow values M(R,θ) stored in scan data array 150 are converted to values M(x,y) which indicate gray shade (for tissues), and to color (for flow) at pixel locations (x, y) in the image. Such polar coordinate to Cartesian coordinate conversion of the ultrasonic image data is described, for example, in an article by Steven C. Leavitt et al in *Hewlett-Packard Journal*, October, 1983, pp. 30–33, entitled "A Scan Conversion Algorithm for Displaying Ultrasound Images."

Regardless of the particular conversion made by digital scan converter 154, the resulting image data are written to a memory 155 which stores a two-dimensional array of converted scan data. A memory control 156 provides dual port access to memory 155 such that digital scan converter 154 can continuously update the values therein with fresh data while a display processor 157 reads the updated data. Display processor 157 is responsive to operator commands received from a control panel 158 to perform conventional image processing functions on the converted scan data in memory 155. For example, the range of brightness levels indicated by the converted scan data in memory 155 may far exceed the brightness range of display device 160. Indeed, the brightness resolution of the converted scan data in memory 155 may far exceed the brightness resolution of the human eye, and manually operable controls are typically provided which enable the operator to select a window of brightness values over which maximum image contrast is to be achieved. The display processor reads the converted scan data from memory 155, provides the desired image enhancement, and writes the enhanced values to a display memory 161.

Display memory 161 is shared with a display controller circuit 162 through a memory control circuit 163, and the values therein are mapped to control brightness and color of the corresponding pixels in display 160. Display controller 162 is a commercially available integrated circuit designed to operate the particular type of display 160 used. For example, display 160 may be a CRT (cathode ray tube), in which case display controller 162 is a CRT controller chip which provides the required sync pulses for the horizontal and vertical sweep circuits and maps the display data to the CRT at the appropriate time during the sweep.

It should be apparent to those skilled in the art that display system 17 may take one of many forms depending on the capability and flexibility of the particular ultrasound system. In the preferred embodiment described above, programmed microprocessors are employed to implement the digital scan converter and display processor functions, and the resulting display system is, therefore, very flexible and powerful.

Figure 5:
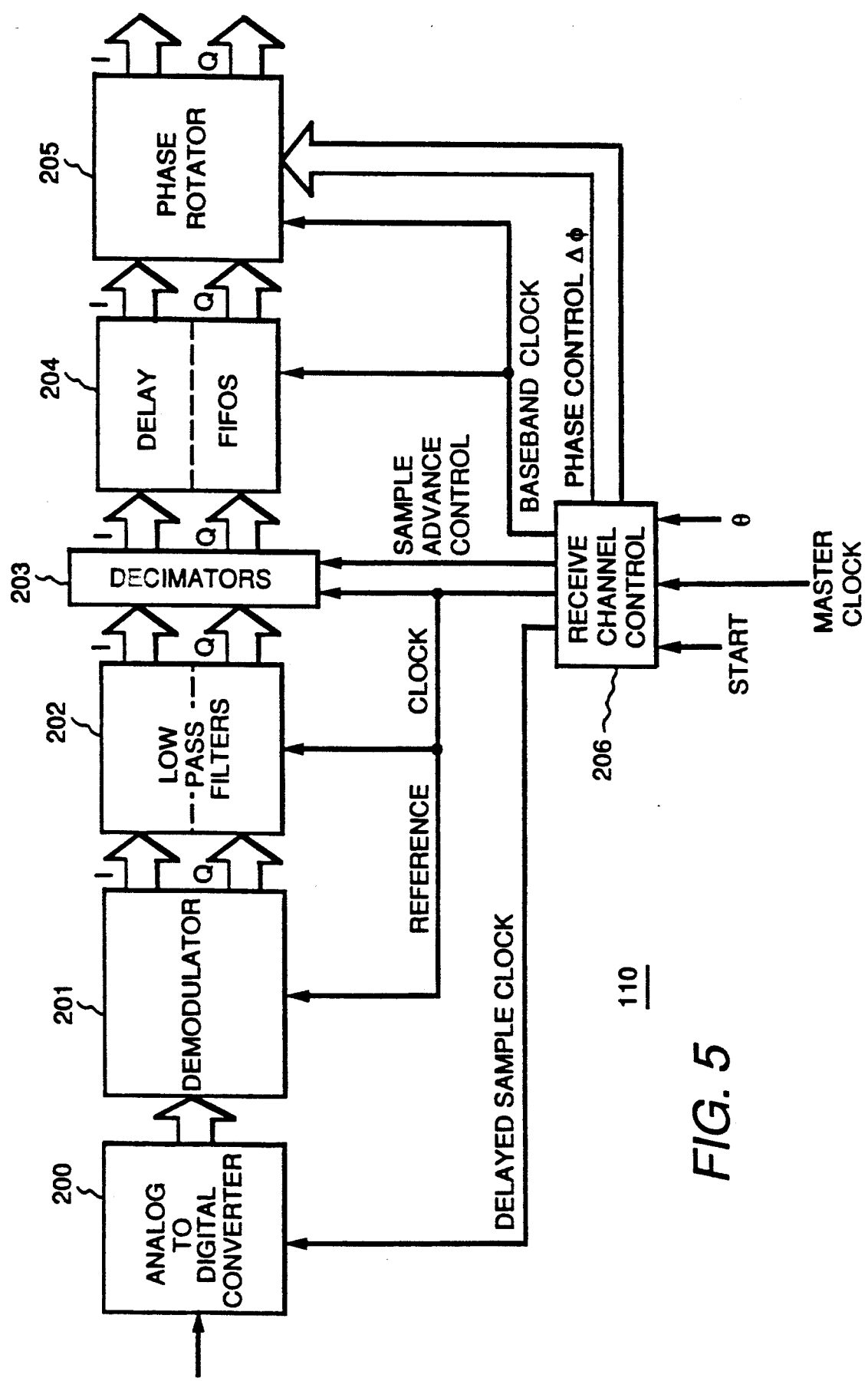
FIG. 5 is a block diagram of a receiver channel which forms part of the receiver of FIG. 3.

As indicated above with reference to FIG. 3, beam forming section 101 of receiver 14 is comprised of a set of receiver channels 110—one for each element 12 of transducer 11. Referring particularly to FIG. 5, each receiver channel is responsive to a START command, a 40 MHz master clock, and a beam angle signal (θ) from digital controller 16 (FIG. 1) to perform the digital beam forming functions. These include: sampling the analog input signal in an analog-to-digital converter 200, demodulating the sampled signal in a demodulator 201; filtering out the high frequency sum signals produced by demodulator 201 with low pass filters 202; reducing the data rate in decimators 203; and time delaying and phase adjusting the resulting digital data stream in delay FIFOs (i.e., first-in/first-out memories) 204 and phase rotator 205. All of these elements are controlled by a receive channel control 206 which produces the required clock and control signals in response to the commands from digital controller 16. In the preferred embodiment, all of these elements are contained on a single integrated circuit.

Referring still to FIG. 5, analog-to-digital converter 200 samples the analog input signal, indicated graphically by waveform 210 in FIG. 9A, at regular intervals determined by the leading edge of a delayed sample clock signal from receive channel control 206. In the preferred embodiment the sample clock is a 40 MHz clock signal to enable use of ultrasonic frequencies up to 20 MHz without violating the Nyquist sampling criteria. When a 5 MHz ultrasonic carrier frequency is employed, for example, it is sampled eight times per carrier cycle and a 10-bit digital sample is produced at the output of the analog-to-digital converter at a 40 MHz rate. These samples are supplied to demodulator 201 which mixes each sample with both a reference that is in-phase with the transmitted ultrasonic carrier, and with a reference in quadrature with the transmitted ultrasonic carrier. The demodulator reference signals are produced from stored SINE and COSINE tables that are read out of their respective ROM memories by a 40 MHz reference clock signal from receive channel control 206. The SINE value is digitally multiplied by the sampled input signal to produce a demodulated, in-phase value (I) supplied to a low pass filter 202, and the COSINE value is digitally multiplied by the same sampled input signal to produce a demodulated, quadrature phase value Q output signal to a separate low pass filter 202. The low pass filters 202 are finite impulse response filters tuned to pass the difference frequencies output by demodulator 201, but block the higher, sum frequencies. As shown by waveform 215 in the graph of FIG. 9B, the output signal of each low pass filter is, therefore, a 40 MHz stream of digital values which indicate the magnitude of the I or Q component of the echo signal envelope.

For a detailed description of an analog-to-digital converter, demodulator, and a low pass filter circuit, reference is made to commonly assigned U.S. Pat. No. 4,839,652 which issued Jun. 13, 1989 and is entitled "Method and Apparatus For High Speed Digital Phased Array Coherent Imaging System."

Referring still to FIG. 5, the rate at which the demodulated I and Q components of the echo signal are sampled is reduced by decimators 203. The 12-bit digital samples are supplied to the decimators at a 40 MHz rate, which is unnecessarily high from an accuracy standpoint and which is difficult to maintain throughout the system. Accordingly, decimators 203 select every eighth digital sample to reduce the data rate down to a 5 MHz rate. This corresponds to the frequency of a baseband clock signal produced by receive channel control 206 and employed to operate the remaining elements in the receiver channel. The I and Q output signals of decimators 203 are thus digitized samples 219 of the echo signal envelope indicated by dashed line 220 in the graph of FIG. 9C. The decimation ratio and the baseband clock frequency can be changed to values other than 8:1 and 5 MHz.

The echo signal envelope represented by the demodulated and decimated digital samples is then delayed by delay FIFOs 204 and phase shifted by phase rotator 205 to provide the desired beam steering and beam focusing. Delay FIFOs 204 are memory devices into which the successive digital sample values are written as they are produced by decimators 203 at a rate of 5 MHz. These stored values are written into successive memory addresses and they are then read from the memory device and supplied to phase rotator 205. The amount of initial delay, illustrated graphically in FIG. 9D, is determined by the difference between the memory location from which the digital sample is currently being supplied and the memory location in which the currently received digital sample is being stored. The 5 MHz baseband clock signal establishes 200 nanosecond intervals between stored digital samples and FIFOs 204 can, therefore, provide a time delay measured in 200 nanosecond increments up to their maximum of 25.6 microseconds.

The time delay provided by delay FIFOs 204 is dynamically changed during receipt of the echo signal by advancing the data points sampled by decimators 203. Each advancement of the sampled data causes the data stream being supplied to delay FIFOs 204 to effectively be delayed by an additional 25 nanoseconds (1/40 MHz). A sample advance control line 224 driven by receive channel control 206 determines when each such advance will occur.

Phase rotator 205 enables the digitized representation of the echo signal to be phase rotated. The I and Q digital samples which are supplied to phase rotator 205 may be represented, as shown in FIG. 9E, by a phasor 221 and the rotated I and Q digital samples produced by phase rotator 205 may be represented by a phasor 222. The magnitudes of the phasors (i.e. the vector sum of the I and Q components of each) are not changed, but the I and Q values are changed with respect to one another such that the output phasor 222 is rotated by an amount $\Delta\phi$ from the input phasor 221. The phase can be either advanced ($+\Delta\phi$) or delayed ($-\Delta\phi$) in response to a phase control signal received by phase rotator 205 on a bus from receive channel control 206. For a detailed description of phase rotator 205, reference is made to commonly assigned U.S. Pat. No. 4,896,287 which issued on Jan. 23, 1990, entitled "Cordic Complex Multiplier", and is incorporated herein by reference.

For a general description of receiver channel 110 and a detailed description of how the I and Q output signals of each receiver channel 110 are summed together to form a beam signal, reference is also made to commonly assigned U.S. Pat. No. 4,983,970 which issued on Jan. 8, 1991, entitled "Method and Apparatus For Digital Phased Array Imaging" and which is incorporated herein by reference. For a detailed description of the receive channel control 206, reference is made to commonly assigned U.S. patent application Ser. No. 867,597, filed Apr. 13, 1992, entitled "Ultrasound Imaging System With Improved Dynamic Focusing" and also incorporated herein by reference.

Figure 6:
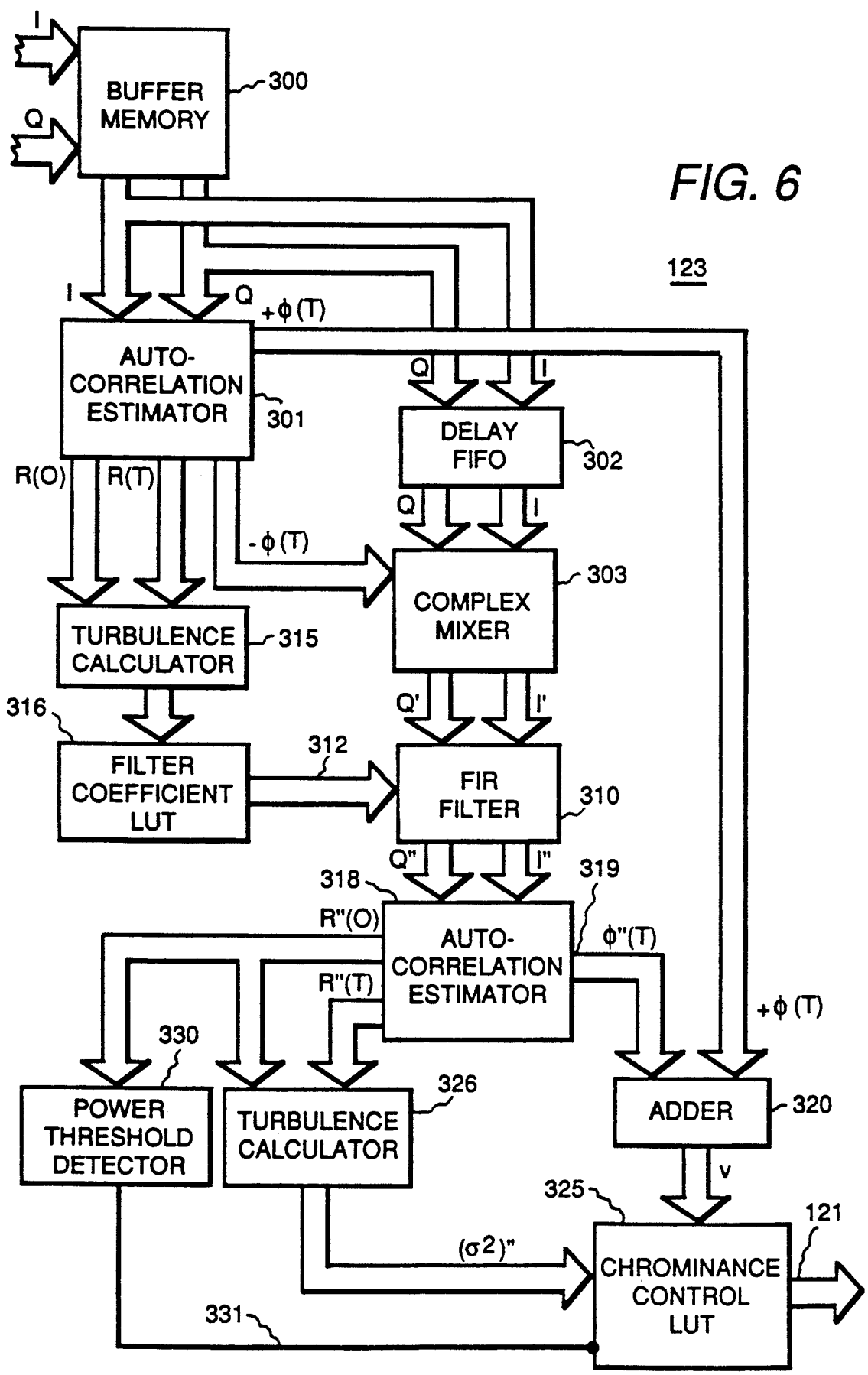
FIG. 6 is a schematic diagram of a color flow processor according to the present invention, which forms part of the receiver of FIG. 3.

Color flow processor 123, shown in detail in FIG. 6, and which may be constructed of commercially available integrated circuits, includes a buffer memory 300 which stores the I and Q samples of the demodulated echo signals produced by the beam forming section of the receiver. For each firing of the transmitter, a set of up to two thousand echo beam signal samples are acquired and stored in buffer memory 300. Typically, from four to sixteen firings are performed at each beam angle $\theta$, and buffer memory 300 thus stores a set of four to sixteen echo beam signal samples at each range R. It is these four to sixteen echo signal samples that are employed to measure flow at each position R,$\theta$ and it will be appreciated that all of these samples are needed if an accurate measurement is to be made.

After completion of all the firings at a particular beam angle $\theta$, buffer memory 300 stores a set of echo beam samples for each range R. Each of these sets of echo beam samples is applied to the I and Q inputs of an autocorrelation estimator circuit 301 and a delay FIFO 302. The autocorrelation estimator is comprised of a complex conjugate multiplier, a pair of delays and a pair of integrators, as described by C. Kasai et al in an article in *IEEE Transactions on Sonics and Ultrasonics*, VOL. SU-32, No. 3, May 1985, entitled "Real-Time Two-Dimensional Blood Flow Imaging Using Autocorrelation Technique" which is incorporated herein by reference. This circuit produces an output signal $\phi(T)$ which represents the mean value of the frequency of the set of echo signal samples applied to its inputs. Thus if there is no movement of the reflectors, there is no Doppler change in frequency of the echo samples and this output signal is zero. If there is motion in one direction, output signal $\phi(T)$ has a positive value, and if motion is in the opposite direction, output signal $\phi(T)$ has a negative value.

The mean value output signal $\phi(T)$ is applied to the reference input of a complex mixer circuit 303. Simultaneously, the delayed I and Q values of the same set of demodulated echo signal samples used to produce the signal $\phi(T)$ is applied to the inputs of complex mixer 303. Frequency shifted output signals I' and Q' are produced by complex mixer 303 according to the following equations:

$$I' = I \cos\phi(T) + Q \sin\phi(T)$$

$$Q' = I \sin\phi(t) - Q \cos\phi(T)$$

Figure 7A:
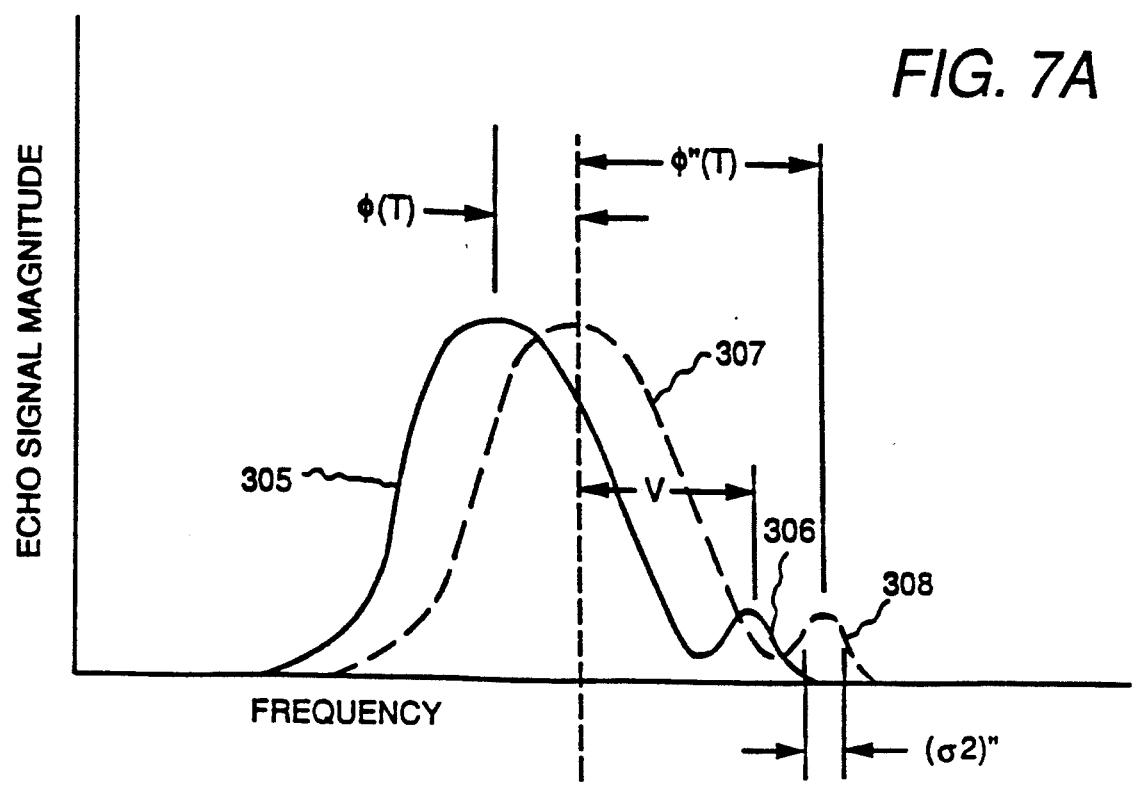
FIGS. 7A and 7B are graphical illustrations used to explain the operation of the color flow processor of FIG. 6.

The effect of this complex mixing with the mean frequency $\phi(T)$ is to shift all the demodulated echo signal frequencies by the value $-\phi(T)$. Since in most situations the wall signal components dominate the echo signal, the measured mean frequency is the mean frequency of the wall signal components, and the resulting shift in frequency by complex mixer 303 in essence shifts the mean value of the wall signal frequency to zero, or D.C. As shown in FIG. 7A, for example, the echo signal may include a wall signal component 305 which has been shifted in frequency in one direction from the carrier due to the Doppler effect. The echo signal also includes a much smaller flow signal component 306 which has been shifted by the Doppler effect in the other direction. The measured mean frequency $\phi(T)$ of the total signal is essentially that of the much larger wall signal component 305, and the resulting shifted echo signal at the output of complex mixer 303 is indicated by the dashed lines 307 and 308. The large wall signal component has thus been shifted in frequency and is now substantially centered about D.C.

Figure 7B:
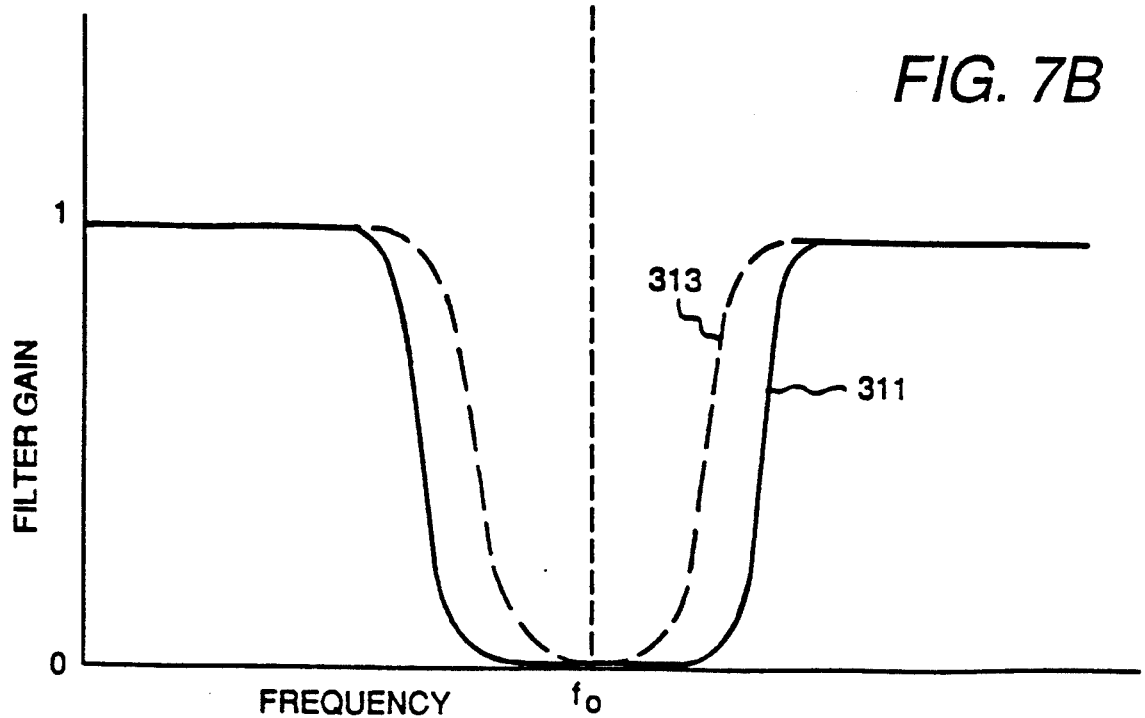

Referring again to FIG. 6, the shifted echo beam samples I' and Q' are applied to the inputs of a circular convolution filter 310 having a stop band centered at D.C., as shown by solid line 311 in FIG. 7B. This stop band is symmetric about D.C. and its width is determined by filter coefficients which are supplied to filter 310 from a filter coefficient look-up table (LUT) 316. For example, another set of applied filter coefficients may produce the narrower stop band indicated in FIG. 7B by dashed line 313.

Referring again to FIG. 6, autocorrelation estimator circuit 301 has two additional outputs R(O) and R(T) from which the variance $\sigma^2$ of the unfiltered baseband echo signal can be calculated. This calculation is performed by a turbulence calculator circuit 315 in accordance with the following equation:

$$\sigma^2 = (1 - |R(T)|/R(0))/T^2$$

where T is the emission interval of ultrasonic pulses. As shown in FIG. 7A, this variance ($\sigma^2$) is an indication of the width of the wall signal components, and it is supplied to the address terminals of filter coefficient look-up table (LUT) 316, shown in FIG. 6. Filter coefficient LUT 316 stores on each of its addressable lines a set of filter coefficients which are read out through a bus 312 to circular convolution filter 310. These filter coefficients are preselected such that for any given variance ($\sigma^2$) as an input signal, filter coefficient LUT 316 produces a set of filter coefficients which match the stop band of filter 310 to the bandwidth of the applied echo signal. As a result, at the output of circular convolution filter 310 is a filtered echo signal which is comprised primarily of the flow signal components 308 shown in FIG. 7A.

Referring to FIG. 6, the filtered echo signal components I'' and Q'' are supplied to a second autocorrelation estimator circuit 318. Circuit 318 is identical to autocorrelation estimator 301 and produces at one output 319 a mean value $\phi''(T)$ which is an estimate of the mean value of the shifted flow signal component frequencies. The frequency shift imposed on this flow signal component by complex mixer 303 is offset by adding the $\phi(T)$ output signal of autocorrelation estimator 301 to the signal $\phi''(T)$ in a digital adder 320. The resulting signal is an estimate of the mean Doppler shift of the flowing reflectors, which in turn is proportional to their mean velocity.

The output signal (v) of adder 320 forms one component of the flow signal produced by color flow processor 123. This flow signal component (v) is applied to the least significant digit address inputs on a chrominance control look-up table memory 325 which resides in the display system (FIG. 4). Each addressable line in this memory 325 stores twenty four bits of data which are read out on bus 121. Eight of these bits indicate the intensity of red, eight bits indicate the intensity of green, and eight bits indicate the intensity of blue. These bit patterns are preselected such that as the flow velocity signal v changes in direction or magnitude, the color of the pixel at the location R,$\theta$ is changed. For example, flow toward the transducer may be indicated as red and flow away from the transducer may be indicated as blue. The faster the flow, the brighter the color To indicate the nature of the flowing reflectors, a turbulence calculator 326 is coupled to the R''(O) and R''(T) outputs on second autocorrelation estimator 318. Turbulence calculator 326 is identical to turbulence calculator 315 described above, and produces an output signal ($\sigma^2$)'' which indicates the frequency spread of the flow signal component of the baseband echo signal. This value is indicative of the flow turbulence, since laminar flow has a very narrow range of velocities while turbulent flow is a mixture of many velocities. The 4-bit turbulence value ($\sigma^2$)'' is produced from color flow processor 123 as part of the flow signal on bus 121, and is applied to the most significant digit address terminals on chrominance control LUT 325. The address is completed by selecting a line in LUT 325 for producing an output signal on bus 121. For example, for each red and blue value which is addressable by the velocity input signal (v) to chrominance control LUT 325, there is a set of sixteen entries in the LUT with different amounts of green. The amount of green is selected by the turbulence measurement ($\sigma^2$)''. As a result, the velocity of flow at a point in the image is indicated by the amount of red or blue and the degree of turbulence is indicated by the amount of green.

When the flow signal component in the baseband echo signal drops below a minimum level, it is not possible to discern flow from the background noise. When this occurs, the color output signal from chrominance control LUT 325 is disabled so that no color is produced and the pixel appears grey as determined solely by the magnitude of the echo signal. This is accomplished by a power threshold detector 330 which is responsive to the R''(O) output signal of autocorrelation estimator 318 and supplies a logic signal on a control line 331 to chrominance control LUT 325. The R''(O) output signal is indicative of the area under the flow signal components curve 308 (FIG. 7A), and is therefore indicative of the flow signal power. If the power exceeds a preset level, chrominance control LUT 325 is enabled through control line 331, and if it drops below that level, LUT 325 is disabled.

Figure 8A:
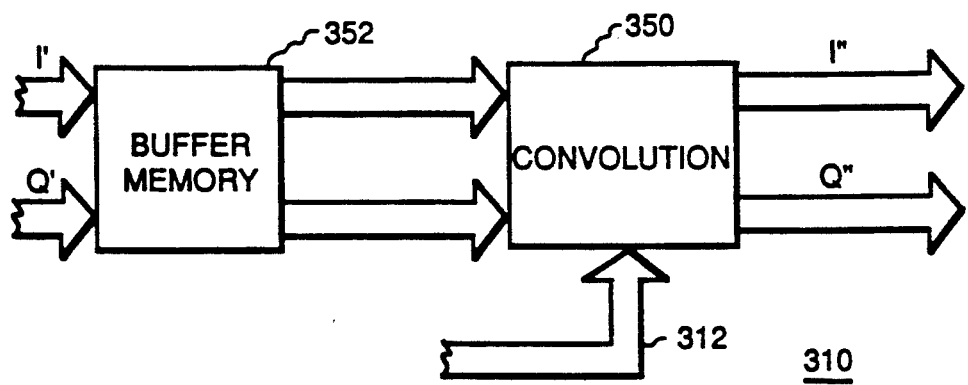
FIGS. 8A and 8B are block diagrams of two embodiments of a circular convolution filter employed in the color flow processor of FIG. 6.

As shown in FIG. 8A, circular convolution filter 310 (FIG. 6) may be formed with an integrated circuit 350 that performs a conventional convolution function, such as Plessey PDSP 16256A, and a buffer memory 352 which stores the set of echo beam samples to be filtered. Convolution circuit 350 is used, for example, in a FIR filter, where the filter coefficients, or kernel (h), are loaded into the circuit 350 through bus 312 and the digitized set of sample data (f) to be filtered is supplied from buffer memory 352. The convolution circuit 350 performs a conventional convolution of the input data (f) with the kernel (h) to produce a set of digitized output echo signal samples ($g_k$):

$$g_k = \sum_{i=0}^{n-1} h_{((n-1)-i)} f_{(k+i)} \quad 0 \leq k \leq N - n \tag{3}$$

where N is the number of echo signal samples in the data (f), and n is the number of coefficients in the kernel (h). For example, if there are 16 echo beam samples to be filtered with a four coefficient filter kernel, the sample data (f) is clocked into convolution circuit 350 and the first filtered output sample is produced after the first four input samples have been processed. When the sixteenth input sample has been processed, thirteen (N−n+1) output samples have been produced and may be used for subsequent processing as described above.

To practice the present invention, a circular convolution is performed by sequentially feeding in the same set of echo beam samples a second time. In the above example, the first three beam samples are again supplied to convolution circuit 350 to produce three more output samples for a total of sixteen. This is written mathematically as:

$$g_k = \sum_{i=0}^{n-1} h_{((n-1)-i)} f_{((k+i) \bmod (N))} \quad 0 \leq k \leq N-1 \quad (4)$$

It can be appreciated that when the number of filter coefficients in the kernel is increased to provide a narrower filter, that the circular convolution filter 310 still produces the same number of output samples as are fed in by using beam samples a second time. In most cases, the size of the filter kernel is set equal to the number of beam samples being processed so that the set of beam samples is fed in twice in sequence to the convolution circuit 350.

As equation (4) shows, the fundamental assumption behind the circular convolution is that the signal to be filtered is repetitive in time. This assumption is only valid because the dominant frequency component of the signal has already been shifted down to D.C. by complex mixer 303 shown in FIG. 6. Moreover, this assumption of repetitiveness would also be valid if complex mixer 303 had shifted the dominant frequency component to any frequency given by:

$$f = \frac{n}{T}$$

where f is the frequency to which the dominant frequency component is shifted, n is an integer, and T is the length of time spanned by the data samples (the number of samples times the sampling rate). However, if n is any integer other than 0, the subsequent filters are more difficult to implement.

In the apparatus shown in FIG. 8A, very narrow wall signal components centered at D.C. may be filtered out with the kernel filter coefficients set to filter out only the D.C. component. With a set of sixteen echo beam samples the sixteen filter coefficients were set as follows:

15/16, 1/16, 1/16, 1/16, 1/16, 1/16, 1/16, 1/16, 1/16, 1/16, 1/16, 1/16, 1/16, 1/16, 1/16, 1/16.

With a slightly broader range of wall signal components, the D.C. frequency bin and the one to either side of D.C. may be filtered with the following set of filter coefficients:

1.0, 0.480216, −1.0, −0.746035, −3.0, −0.619914, −3.8243, 6.44155, 13.0, −12.1371, −1.0, −2.91082, 1.0, 0.276769, 1.82843, 1.21530.

Figure 8B:
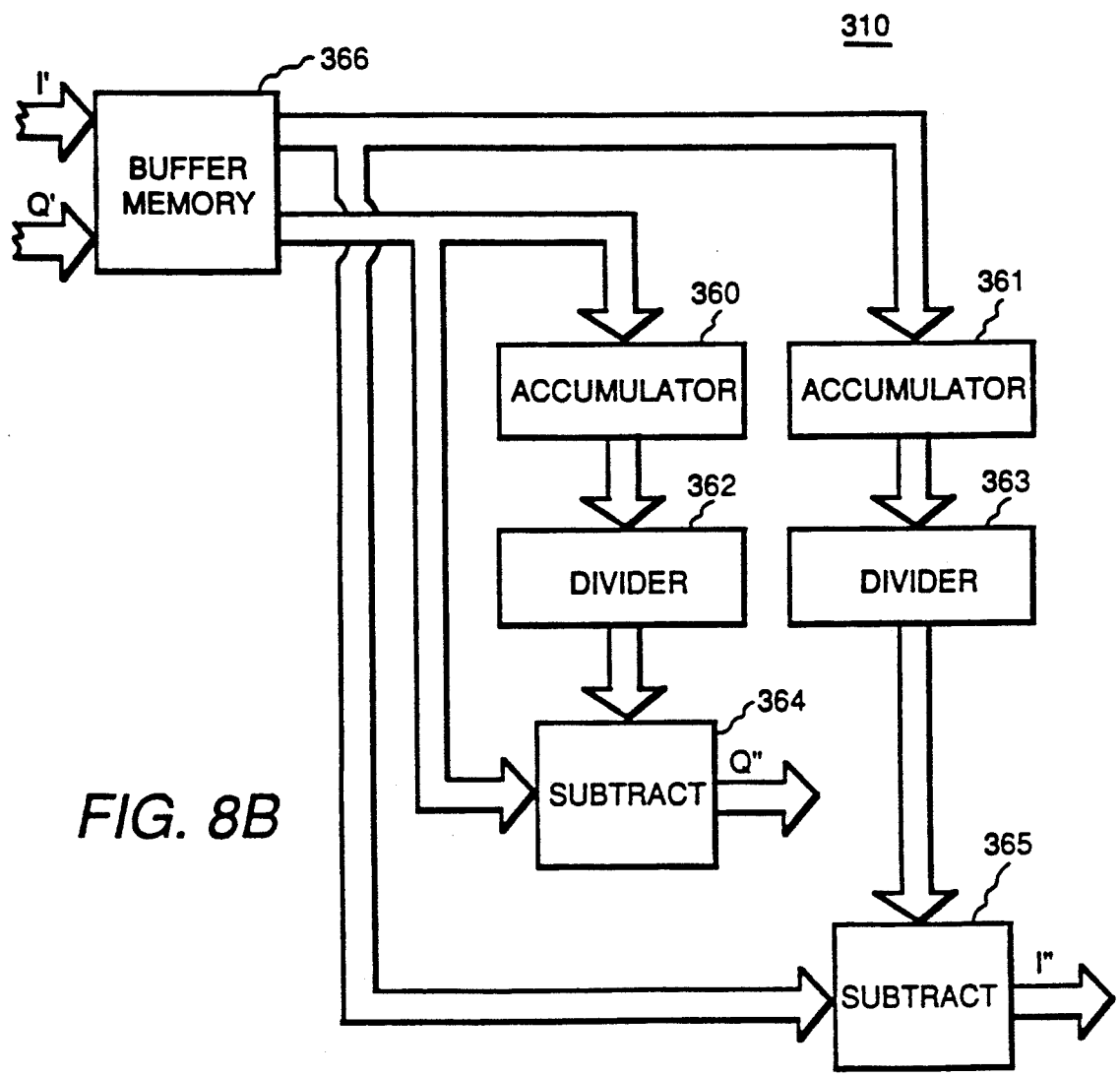

Referring particularly to FIG. 8B, in applications where removing only the D.C. component is sufficient to suppress the wall signal components, a much simpler circuit can be used to perform the circular convolution. In this special case of circular convolution the average value of the set of echo beam samples is subtracted from each echo beam sample to effectively remove the D.C. component of the signal. This function can be performed on the I' and Q' signal components with accumulators 360 and 361, dividers 362 and 363, and subtractors 364 and 365. More specifically, the I' and Q' values of each frequency shifted beam sample stored in buffer memory 366 is applied to respective accumulators 360 and 361. The accumulators add the separate values together. The average value of each component I' and Q' is then found by dividing their sum by the number of samples in the set. This is performed in dividers 362 and 363. If the number of samples in each set is limited to a number equal to a power of two (i.e. 2, 4, 8 or 16), this division can be accomplished by a simple shifting of the binary numbers at the output of accumulators 360 and 361. The set of frequency shifted beam samples is again read out of buffer memory 366 and the average value output signal from each of dividers 362 and 363, respectively, is subtracted from each sample by subtractors 364 and 365, respectively. As with the embodiment of FIG. 8A, a very narrow filter function is achieved without diminishing the number of beam samples available at the output. However, the embodiment of FIG. 8B is less versatile than the embodiment of FIG. 8A, since it will only filter out the D.C. component of the frequency shifted echo signal samples.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. In an ultrasonic imaging system which includes a receiver for demodulating an ultrasonic echo signal received from an ultrasonic transducer to produce a set of baseband echo signal samples, and further includes a display system, a color flow processor comprising:

a mixer for shifting frequency of the set of baseband echo signal samples produced by said receiver such that wall signal components in said set of baseband echo signal samples are at essentially D.C.;

a circular convolution filter for filtering out signal components in the set of shifted baseband echo signal samples from said mixer which have a frequency near D.C.;

an autocorrelation estimator for indicating the mean frequency of the set of filtered, shifted baseband echo signal samples provided by the circular convolution filter; and chrominance control means responsive to the autocorrelation estimator for controlling color of a display on said display system.

2. The apparatus of claim 1 wherein the circular convolution filter includes memory means for storing the set of shifted baseband echo signal samples, and a convolution circuit for repeatedly receiving the shifted baseband echo signal samples sequentially from said memory means so as to produce an equal number of filtered, shifted baseband echo signal samples.

3. The apparatus of claim 2 including a look-up table for providing the convolution circuit with a kernel having filter coefficients equal in number to the number of samples in said set of shifted baseband echo signal samples.

4. The apparatus of claim 3 including means coupled to said look-up table for providing the variance of the set of baseband echo signal samples produced by said receiver to said look-up table.

5. The apparatus of claim 1 in which the circular convolution filter includes memory means for storing the set of shifted baseband echo signal samples, means responsive to said memory means for calculating the average value of said set of shifted baseband echo signal samples, and means for producing the filtered shifted baseband echo signal samples by subtracting the calculated average value from respective ones of the shifted baseband echo signal samples.

6. The apparatus of claim 1 wherein said circular convolution filter has a stop band centered at D.C.

7. The apparatus of claim 1 including an additional autocorrelation estimator responsive to the set of received baseband echo signal samples for providing to said mixer an output signal representing the mean value of the frequency of the set of baseband echo signal samples produced by said receiver.

8. The apparatus of claim 5 wherein said means for calculating the average value of said set of shifted baseband echo signal samples comprises accumulator means coupled to said memory means for summing the values of each frequency shifted sample stored in said memory means, and divider means coupled to said accumulator means for dividing the sum in said accumulator means by the number of samples in said set.

9. A color flow processor for use in an ultrasonic imaging system wherein a received ultrasonic echo signal is converted to a set of baseband echo signal samples, said color flow processor comprising:
   mixer means for shifting frequency of the set of baseband echo signal samples such that wall signal components therein are at essentially D.C.;
   means for filtering out signal components in the set of shifted baseband echo signal samples from said mixer means which have a frequency near D.C.;
   an autocorrelation estimator for indicating the mean frequency of the set of filtered, shifted baseband echo signal samples provided by the filtering means;
   display means for generating images in which a line is produced in response to each separate echo signal, respectively; and
   chrominance control means responsive to the autocorrelation estimator for controlling color of said images presented on said display means.

10. The color flow processor of claim 9 wherein the filtering means comprises a circular convolution filter.

11. The color flow processor of claim 10 wherein the circular convolution filter includes memory means for storing the set of shifted baseband echo signal samples, and a convolution circuit for repeatedly receiving the shifted baseband echo signals sequentially so as to produce an equal number of filtered, shifted baseband echo signal samples.

12. The color flow processor of claim 11 including a look-up table for providing the convolution circuit with a kernel having filter coefficients equal in number to the number of samples in said set of shifted baseband echo signal samples.

13. The color flow processor of claim 12 including means coupled to said look-up table for providing the variance of the set of baseband echo signal samples produced by said receiver to said look-up table.

14. The color flow processor of claim 10 in which the circular convolution filter includes memory means for storing the set of shifted baseband echo signal samples, means for calculating the average value of said set of shifted baseband echo signal samples, and means for producing the filtered shifted baseband echo signal samples by subtracting the calculated average value from respective ones of the shifted baseband echo signal samples.

15. The color flow processor of claim 14 wherein said means for calculating the average value of said set of shifted baseband echo signal samples comprises accumulator means coupled to said memory means for summing the values of each frequency shifted sample stored in said memory means, and divider means coupled to said accumulator means for dividing the sum in said accumulator means by the number of samples in said set.

16. The color flow processor of claim 10 wherein said circular convolution filter has a stop band centered at D.C.

17. The color flow processor of claim 9 including an additional autocorrelation estimator responsive to the set of received baseband echo signal samples for providing to said mixer means an output signal representing the mean value of the frequency of the set of baseband echo signal samples 18. A method of operating a color flow processor in an ultrasonic imaging system which includes a receiver for demodulating an ultrasonic echo signal received from an ultrasonic transducer to produce a set of baseband echo signal samples and a display system, comprising the steps of:
   shifting frequency of the set of baseband echo signal samples produced by said receiver such that wall signal components in said set of baseband echo signal samples are at essentially D.C.;
   filtering out signal components in the set of shifted baseband echo signal samples which have a frequency near D.C.;
   determining the mean frequency of the set of filtered, shifted, baseband echo signals; and
   controlling color of a display on said display system in accordance with said mean frequency.

19. The method of claim 18 wherein the step of filtering out signal components comprises storing the set of shifted baseband echo signal samples, and producing a number of filtered, shifted baseband echo signal samples equal to the number of stored shifted baseband echo signal samples repeatedly provided sequentially from storage.

20. The method of claim 18 wherein the step of filtering out signal components comprises storing the set of shifted baseband echo signal samples, determining the average value of the stored set of shifted baseband echo signal samples, and subtracting the average value of the stored set of shifted baseband echo signal samples from respective ones of the stored set of shifted baseband echo signal samples.

* * * * *